United States Patent
Watson

(10) Patent No.: US 6,929,251 B2
(45) Date of Patent: Aug. 16, 2005

(54) WIRE PULLING METHOD AND APPARATUS

(75) Inventor: Richard Watson, Kearns, UT (US)

(73) Assignee: Overhead Wire Puller LLC, Salt Lake City, UT (US)

( * ) Notice: Subject to any disclaimer, the term of this patent is extended or adjusted under 35 U.S.C. 154(b) by 174 days.

(21) Appl. No.: 10/263,332

(22) Filed: Oct. 2, 2002

(65) Prior Publication Data

US 2004/0065872 A1 Apr. 8, 2004

(51) Int. Cl.⁷ .............................................. B65H 59/00
(52) U.S. Cl. ...................... 254/134.3 FT; 254/134.3 R
(58) Field of Search ................................ 254/134.3 FT, 254/134.7, 134.3 R; 15/104.32, 104.33; 294/1.1, 66.1, 82.1, 82.32, 86.1, 86.24, 86.25, 86.4, 90, 95, 97

(56) References Cited

U.S. PATENT DOCUMENTS 4,083,532 A * 4/1978 Pola .................... 254/134.3 FT
4,854,546 A * 8/1989 Vea ...................... 254/134.3 R

* cited by examiner

*Primary Examiner*—Robert C. Watson
(74) *Attorney, Agent, or Firm*—Thorpe, North & Western LLP

(57) ABSTRACT

A system for pulling wire over or through structural members of a building, including an elongate shuttle, including a leading end and a trailing end. Connecting means are associated with the shuttle, and are configured for connecting to the shuttle a wire to be pulled by the shuttle. An interlock device, separate from the shuttle is selectively and releasably engagable with the shuttle. Engaging means, are associated with the shuttle and selectively and releasably engagable by the interlock device for transferring force from the interlock device to the shuttle to move the shuttle. A method for pulling wire through or over structural members of a building is also provided and includes the steps of connecting a portion of the wire to an elongate shuttle; physically engaging the shuttle with an interlock device at a first location; and feeding the shuttle, and thus the wire to be pulled, with the interlock device from the first location to a second location.

15 Claims, 7 Drawing Sheets

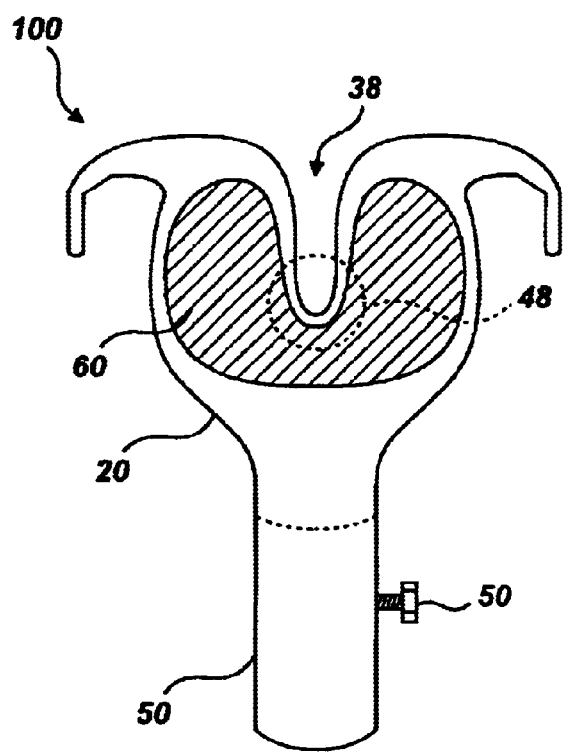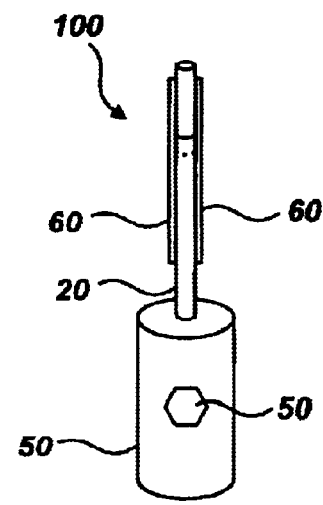
Fig. 5a
Fig. 5b

WIRE PULLING METHOD AND APPARATUS

BACKGROUND OF THE INVENTION

1. Field of the Invention

The present invention relates generally to a tool and a method of using the same to pull wire in a location remote from a user.

2. Related Art

Many workers involved in the new construction, renovation, repair or maintenance industries must routinely pull wire or cable through, over or around various structural elements such as framing, floor joists, trusses, etc. Because such structural members are often located above areas which are readily accessible to workers, such as ceilings, floor joists and trusses, the worker pulling the wire must generally use a ladder to access the area in which the wire is to be pulled. For instance, when pulling wire or cable through a series of floor joists, a worker must place a ladder under the first joist, climb the ladder to pull the wire over or through the joist, then dismount from the ladder, reposition the ladder, and repeat the process for each successive joist.

Such an exercise is very time consuming and requires considerable human labor hours as well as expensive ladders or other elevating equipment which must not only be transported to and from the work site but back and forth while performing the wire pulling. When a ladder must be used, ladders of several sizes may be required due to variations in ceiling heights or roof lines. At times, the terrain under which wire must be pulled is so varied that a ladder will not work and alternate elevating equipment must be used, such as scaffolding. Of course, installing and utilizing scaffolding requires significant labor hours and material expense. Sometimes the height and size of the room in which the wire is to be pulled can require even more expensive elevating equipment, such as mobile scissors jacks.

Traditional methods of pulling wire are also dangerous, in that a ladder is typically mounted and dismounted many times over the course of a job. Falls from ladders or other elevated structures represent a substantial percentage of on-the-job injuries. Using a ladder can add considerably to the potential for on-the-job injuries suffered by workers pulling wire, as well as added danger to other workers performing tasks below or beneath the ladder.

SUMMARY OF THE INVENTION

It has been recognized that it would be advantageous to develop a method and system for pulling wire that does not require a worker to be physically elevated to the location in which the wire is to be pulled.

The present invention provides a system and method and includes an elongate shuttle, including a leading end and a trailing end; connecting means, associated with the shuttle, configured for connecting to the shuttle a wire to be pulled by the shuttle; an interlock device, separate from the shuttle and selectively and releasably engagable with the shuttle; and engaging means, associated with the shuttle and selectively and releasably engagable by the interlock device for transferring force from the interlock device to the shuttle to move the shuttle.

In accordance with another, more detailed aspect of the present invention, the engaging means includes at least one raised portion located on the shuttle, and the interlock device includes a notch, wherein the raised portion on the shuttle is configured to be selectively and releasably engaged by the notch in the interlock device.

In accordance with another, more detailed aspect of the present invention, the at least one raised portion on the shuttle includes opposing engagement and tapered relief sections, the engagement section being substantially orthogonal to an elongate axis of the shuttle, and the tapered relief section extending taperedly toward the leading end of the shuttle.

In accordance with another, more detailed aspect of the present invention, the at least one raised portion extends circumferentially around the shuttle.

In accordance with another, more detailed aspect of the present invention, the interlock device further includes a protrusion, and the engaging means further includes at least one opening formed in the shuttle, the opening being configured to be selectively and releasably engaged by the protrusion on the interlock device.

In accordance with another, more detailed aspect of the present invention, the shuttle includes at least two portions removably coupled to each other.

In accordance with another, more detailed aspect of the present invention, the leading end of the shuttle includes a substantially rounded frontal portion.

In accordance with another, more detailed aspect of the present invention, the shuttle has a cross section that is substantially circular.

In accordance with another, more detailed aspect of the present invention, the system includes an elongate shuttle, configured to be connected to a wire; an interlock device, selectively and releasably engagable with the shuttle, the interlock device including a receiving notch and an engaging area adjacent the receiving notch; and means for attaching an extension device to the interlock device to facilitate use of the wire pulling device in a location removed from a user.

In accordance with another, more detailed aspect of the present invention, the receiving notch is sized and shaped to receive a first portion of the shuttle while the engaging area contacts and transmits force to a second portion of the shuttle to enable transmission of force to the wire being pulled.

In accordance with another, more detailed aspect of the present invention, at least one hook is coupled to the interlock device and is configured to engage an intermediate section of the wire to apply a slack-pulling force to the intermediate section of the wire.

In accordance with another, more detailed aspect of the present invention, the system further includes a substantially high-friction material coupled to the engaging area to provide a substantially high-friction interface between the interlock device and the second section of the shuttle.

In accordance with another, more detailed aspect of the present invention, the means for attaching an extension device comprise a hollow section coupled to the interlock device to facilitate insertion of the extension device into the interlock device.

In accordance with another, more detailed aspect of the present invention, a method for pulling wire through or over structural members of a building is provided and includes the steps of connecting a portion of the wire to an elongate shuttle; physically engaging the shuttle with an interlock device at a first location; and feeding the shuttle, and thus the wire to be pulled, with the interlock device from the first location to a second location.

In accordance with another, more detailed aspect of the present invention, the method includes the further steps of disengaging the interlock device from the shuttle;

re-engaging the shuttle with the interlock device; and pulling the shuttle, and thus the portion of the wire, to a third location.

In accordance with another, more detailed aspect of the present invention, the method includes the further step of creating a slack loop in an intermediate section of the wire by disengaging the interlock device from the shuttle; engaging the intermediate section of the wire with a hook section of the interlock device; and pulling a slack loop in the intermediate section of the wire.

In accordance with another, more detailed aspect of the present invention, the method includes the further step of feeding the shuttle through a hole formed in the structural member through which the wire is to be pulled.

In accordance with another, more detailed aspect of the present invention, the method includes the further step of feeding the shuttle over the top of the structure over which the wire is to be pulled.

In accordance with another, more detailed aspect of the present invention, the method includes the further step of launching the shuttle with the interlock device into an air-born trajectory to enable transference of the shuttle over a distance.

In accordance with another, more detailed aspect of the present invention, the method includes the further step of frictionally engaging the shuttle with the interlock device.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1b is a leading end view of the embodiment of the present invention illustrated in FIG. 1a;

FIG. 3a is a partial side view of an alternate embodiment of the present invention illustrated in FIG. 1a;

FIG. 3b is a partial side view of an alternate embodiment of the present invention illustrated in FIG. 1a;

FIG. 3c is a partial side view of an alternate embodiment of the present invention illustrated in FIG. 1a;

FIG. 4b is a side view of an alternate embodiment of the present invention for use in connection with the embodiment illustrated in FIG. 4a;

FIG. 5a is a front view of an alternate embodiment of the present invention;

FIG. 5b is a side view of the embodiment of the present invention illustrated in FIG. 5a;

DETAILED DESCRIPTION

Figure 1A:
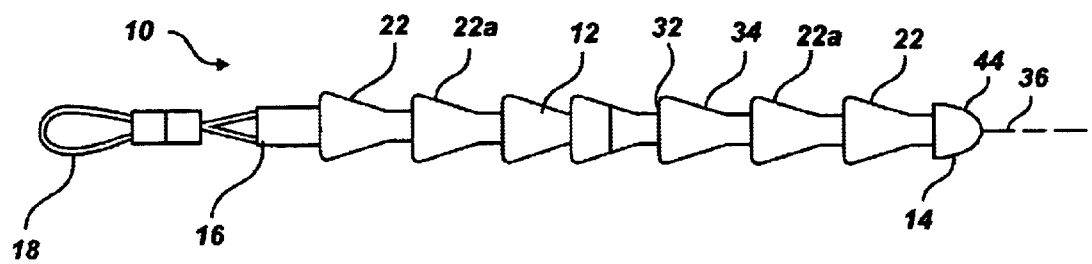
FIG. 1a is a side view of a wire pulling device in accordance with one embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As shown generally at 10 in FIG. 1a, the present invention provides a wire pulling system configured to pull or thread electrical wire over or through structural members of a building. The system 10 includes an elongate shuttle 12 which can include a leading end 14 and a trailing end 16. Connecting means 18 can be associated with the shuttle, and can be configured for connecting to the shuttle a wire to be pulled by the shuttle. An interlock device 20 (shown in FIGS. 5a and 5b) can be provided separately from the shuttle 12 and can be selectively and releasably engagable with the shuttle. Engaging means 22 are associated with the shuttle and can be selectively and releasably engagable by the interlock device for transferring force from the interlock device to the shuttle in order to move the shuttle.

In use, the present invention can aid workers in pulling wire by allowing a worker to quickly and removably secure an end of wire to be pulled to the trailing end of the shuttle. For instance, to connect a wire to the shuttle, a user can simply twist the wire around the connecting means. Once connected to the wire, the shuttle can be slidably engaged by the receiving notch in the interlock device. The worker can lift or otherwise move the interlock device to a location remote from the user and place the shuttle, and thus the wire, in a first location. The shuttle can then be easily disengaged from the interlock device after which the worker can re-engage the shuttle in a different location to pull the wire into another location.

Figure 6:
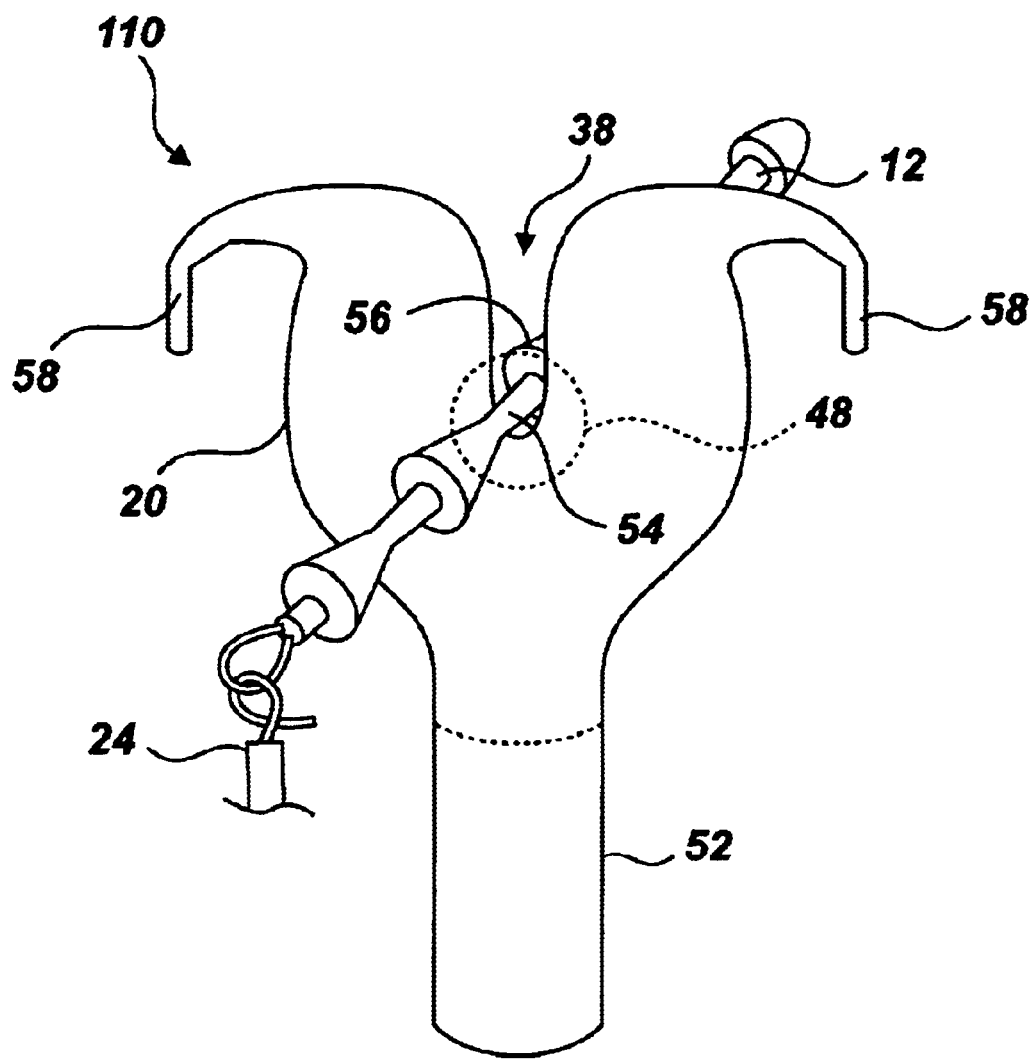
FIG. 6 is a perspective view of an alternate embodiment of the present invention.
Figure 7:
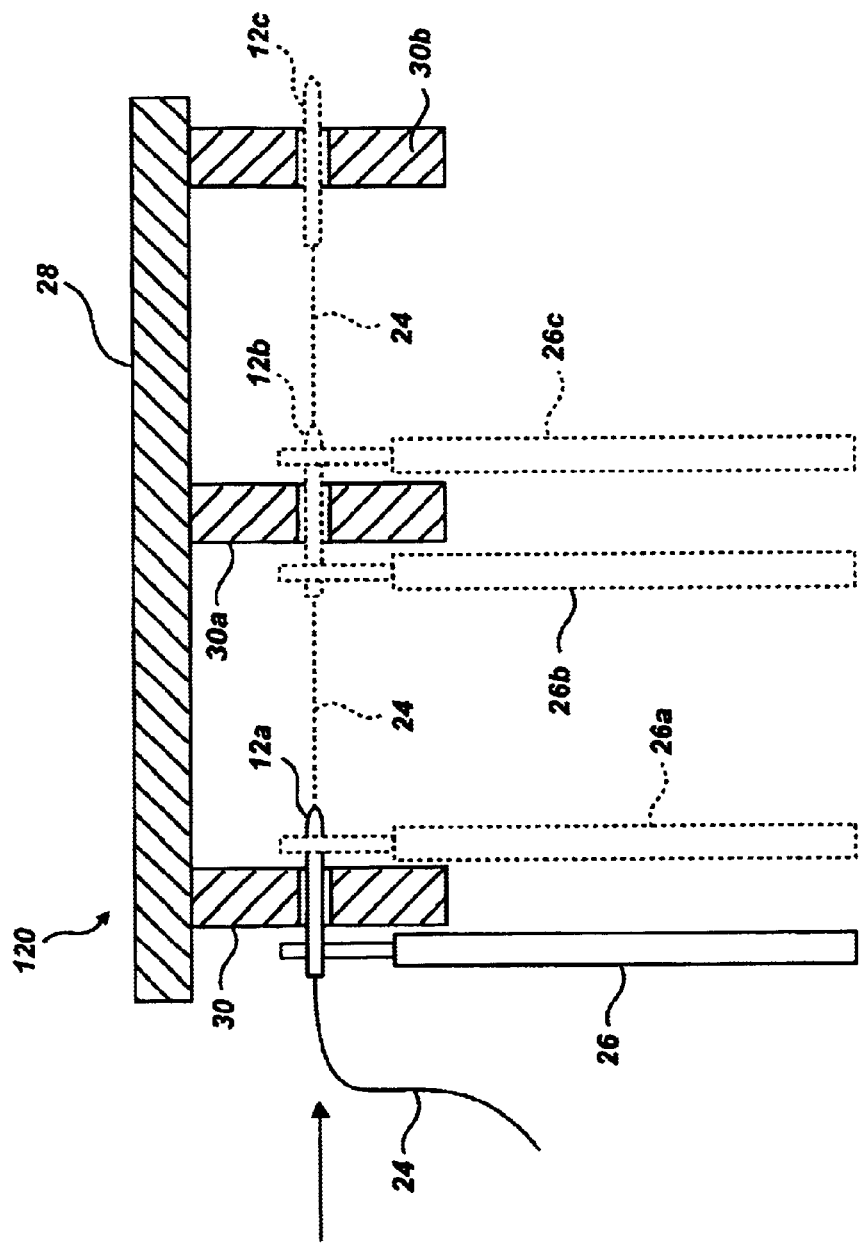
FIG. 7 is a schematic view illustrating the steps of a method in accordance with the present invention.

It is to be understood that the present invention can be utilized to pull or move any number of materials such as electrical wire, cable, telephone wire, communication lines, fiber optic cables, rope, etc. To simplify the discussion herein, the term "wire" will be used to refer to any similar material. Similarly, the present invention is not limited to use in pulling wire through or over floor joists, but can be used to pull wire through or over trusses, frames, ceilings, wall framing etc. One advantageous feature of the present invention is that is can be used to pull wire through or over very tall ceilings without requiring that the worker pulling the wire be physically elevated to a location near the ceiling FIG. 6 illustrates at 110 how the shuttle 12 and interlock device 20 engage with other. As will be appreciated, a wire 24 can be connected to the shuttle and the shuttle can be engaged by the interlock device and moved from one location to another. The interlock device can then be easily disengaged from the shuttle to enable a user to change position and then re-engage the shuttle. The schematic shown in FIG. 7 is presented to more clearly illustrate a method in which the present invention can be used. Shown here at 120 is a floor 28 with a series of floor joists 30 supporting the underside of the floor. Such floor joists typically include knock-out holes that are used to allow wire to be pulled through the joists. In one use of the present invention, a portion of a wire 24 can be connected to the elongate shuttle 12. The elongate shuttle 12 can then be engaged by interlock device 20 which can be attached to an extension pole (shown collectively by 26 in FIG. 7).

Shown at 12a, the shuttle can be fed into the first joist 30 at a first location by lifting the shuttle with the pole and interlock device 26. The pole and interlock device can then be disengaged from the shuttle and the shuttle can be left suspended in the joist. The pole and interlock device can then be repositioned as shown at 26a, whereafter the user can re-engage the shuttle with the interlock device and pull the shuttle completely through the joist 30. The process can then be repeated as shown by the shuttle in position 12b, and the interlock device and pole used in positions 26b and 26c. The shuttle can then be threaded through the third joist 30b into a third position as shown at position 12c. It will be appreciated that by completing these steps, the wire 24 will have been pulled or threaded through the joists without requiring the user to climb a ladder or other structure.

A similar operation can be performed when the wire is pulled over trusses, without requiring that the shuttle be threaded through a hole but simply thrown or placed over the truss. The present invention can also be used to "launch" the shuttle with the interlock device into an air-born trajectory, thereby enabling a user to transfer or move the shuttle over a distance which can span one or more trusses. The user can thus traverse more than one truss at a time, thereby reducing the number of times the shuttle must be engaged and disengaged, saving time and expense. These steps can then be repeated as necessary until the entire length of pull is complete.

As shown in FIGS. 1a through 3 at 10 through 10d, respectively, the engaging means 22 can include at least one raised portion 22a located on the shuttle. The raised portion can be shaped so as to be easily engagable by the interlock device 20 and yet enable the interlock device to both transfer force to the shuttle when in use and to quickly and easily disengage from the shuttle when desired. As shown in FIGS. 3a through 3c by raised portions 22b, 22c and 22d, the size, shape and location of the raised portion can be any known to those skilled in the art. In the embodiment shown in FIGS. 1a through 2b, the raised portion includes opposing engagement 32 and tapered relief 34 sections. The engagement section can be formed substantially orthogonally to an elongate axis 36 of the shuttle 12. The orthogonal engagement section 32 provides a flat, relatively secure surface to which the interlock device can apply force. The tapered relief section 34 can extend taperedly toward the leading end 14 of the shuttle and provides a tapered surface that allows the interlock device to easily slide on and off the shuttle to allow quick engagement and disengagement of the shuttle.

Figure 1B:
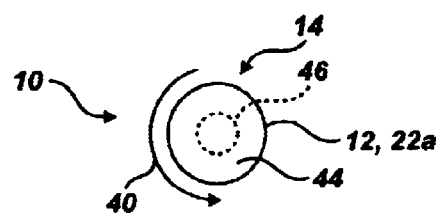

As shown in FIGS. 5a and 5b at 100, the interlock device 20 can include a notch 38. By cooperating with the notch 38 in the interlock device, raised portions 22a of the shuttle can selectively and releasably engage the notch in the interlock device. As shown in FIGS. 1a and 1b, the at least one raised portion 22a can extend circumferentially around the shuttle, as illustrated by arrow 40, to enable the interlock device to engage the shuttle regardless of the rotational orientation of the shuttle.

Figure 4A:
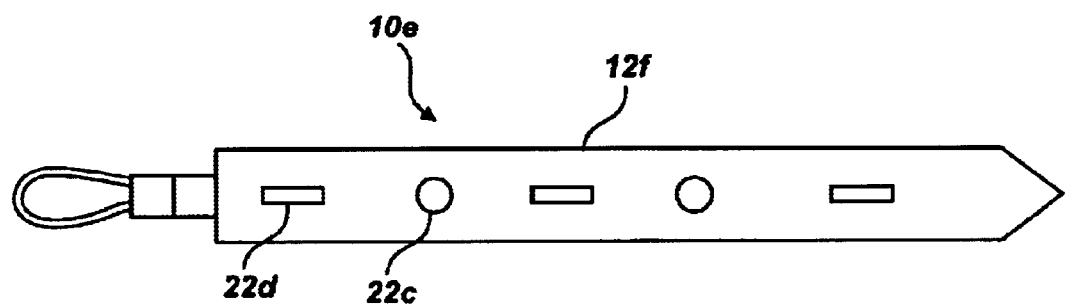
FIG. 4a is a side view of an alternate embodiment of the present invention.
Figure 4B:
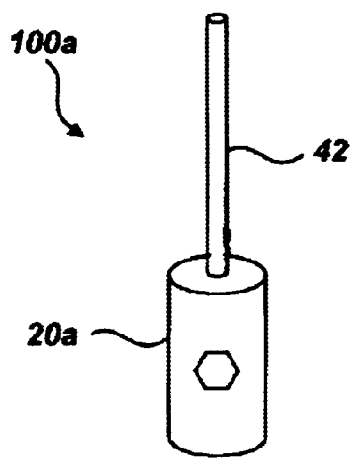

In another embodiment shown at 10e and 100a in FIGS. 4a and 4b, the interlock device 20a can further including a protrusion 42 which can be used to engage a shuttle 12f. For instance, the engaging means 22b and 22c can include at least one opening formed in the shuttle. The opening can be of any shape known to those skilled in the art, such as a rectangular or circular shape, as shown. The protrusion 42 can thus selectively and releasably engage the shuttle 12f to enable quick and easy pulling of wire attached to the shuttle. The engagement means between the interlock device and the shuttle can similarly be any known to those skilled in the art, such as a hook on the interlock device corresponding to a hook or hole on the shuttle, etc.

Figure 2A:
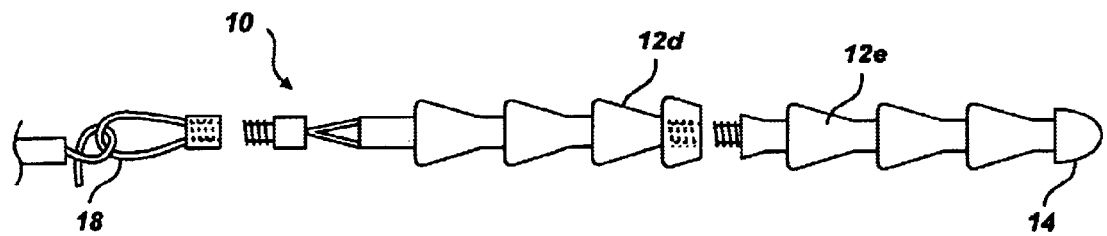
FIG. 2a is a side view of the embodiment of the present invention illustrated in FIG. 1a showing removably attached sections and connecting means.
Figure 2B:
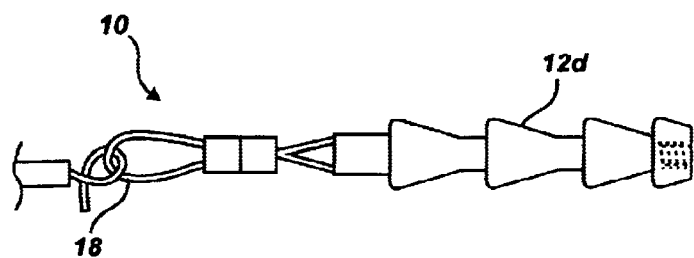
FIG. 2b is a side view of the embodiment of the present invention illustrated in FIG. 2a, showing the device in a partially disassembled state.
Figure 3A:
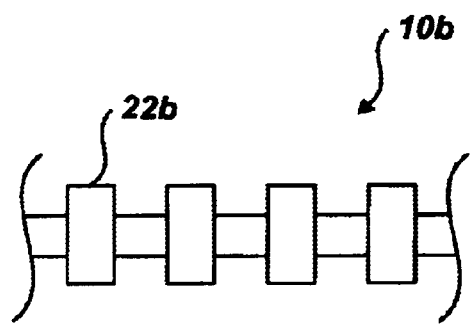
Figure 3B:
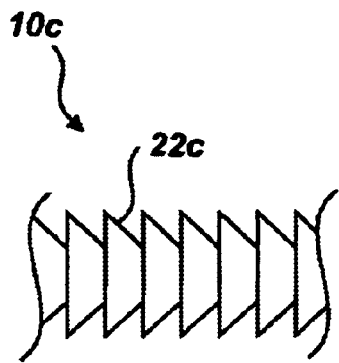
Figure 3C:
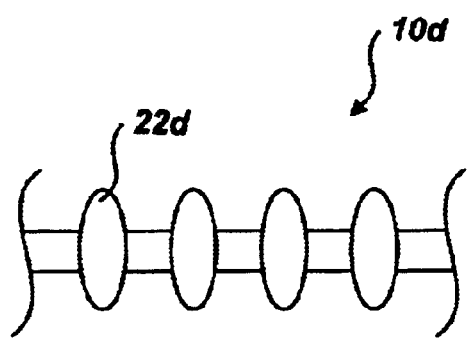

In the embodiment illustrated in FIGS. 2a and 2b, the shuttle includes at least two portions 12d and 12e which are removably coupled to each other. In this embodiment, the shuttle can be used when space available to pull wire is limited. For instance, when pulling wire through holes in a floor joist, it may that the distance from a hole to some obstruction is small enough that the shuttle will not fit entirely through the hole but will be blocked by the obstruction. In this case, the user can disconnect the front portion 12e from the rear portion 12d and use the rear portion as a shorter length shuttle, as illustrated in FIG. 2b. In addition, the connecting means 18 can be removably or threadably attached to the shuttle portion 12d, as shown in FIG. 2a, and can be detached and reattached as necessary. The connecting means 18 can include any known to those skilled in the art, such as the loop shown in the figures, or a hole formed in the shuttle, set screws, clamps, etc.

As shown in FIGS. 1a and 1b, the leading end 14 of the shuttle 12 can include a substantially rounded frontal portion 44. The substantially rounded portion can enable the shuttle to be more easily threaded through holes and helps prevent the shuttle from catching on objects when in use. Also, the shuttle 12 can have a cross section 46 that is substantially circular, as shown in FIG. 2b. This can enable the shuttle to be more easily fed through holes, and provides a more advantageous engaging medium for the interlock device.

FIGS. 5a and 5b illustrate further features of the interlock device 20 which can be selectively and releasably engagable with the shuttle. The interlock device can include a receiving notch 38 and an engaging area 48 adjacent the receiving notch. The engaging area is configured to contact and transfer force from the interlock device to the shuttle. Means 50 for attaching an extension device (52 in FIG. 6) to the interlock device can be included to facilitate use of the invention in a location removed from a user. For instance, the extension device may be a paint pole or other similar device that can enable the user to pull wire in high locations without requiring that the user climb a ladder or other elevating equipment. As shown in FIGS. 5a and 5b, the means 50 for attaching the extension device can comprise a hollow section coupled to the interlock device to facilitate insertion of the extension device into the interlock device. The means 50 for attaching an extension device can also include a threaded connection into which the end of the pole threads, set screws to secure the pole to the interlock device, clamping devices, etc.

As shown in FIG. 6, the receiving notch 38 can be sized and shaped to receive a first portion 54 of the shuttle while the engaging area 48 contacts and transmits force to a second portion 56 of the shuttle to enable transmission of force to the wire 24 being pulled. It will be appreciated that the notch 38 can be formed in a tapering configuration that allows the shuttle to be easily engaged by the interlock device and yet be held securely when the shuttle rests on a bottom of the notch.

The interlock device 20 can include at least one hook 58 coupled to the interlock device to enable a user to engage an intermediate section of the wire 54 to apply a slack-pulling force to the intermediate section of the wire. For instance, when pulling wire it is often the case that a degree of tension builds in the wire after pulling the wire through a distance. This increases the difficulty of pulling the wire because the user must not only overcome the weight of the wire but must contend with the frictional forces causing the tension in the wire. When this happens, a user can utilize the present invention to create slack in the wire by hooking the tensioned portion of the wire with the hook 58 and pulling a slack loop. After the slack loop is pulled, the user can then more easily pull the slacked portion of the wire. By forming a top of each hook 58 near the general plane as the top of the interlock device, the shuttle can be more easily engaged by the interlock device, as the shuttle is guided into the slot 38 by the upper portion of the interlock device and the hook.

As shown in FIGS. 5a and 5b, a substantially high-friction material 60 can be coupled adjacent the engaging area 48 to provide a substantially high-friction interface between the interlock device and the second section of the shuttle. The high friction material can aid in securely engaging a portion of the shuttle with a face of the interlock device, yet allow easy disengagement of the shuttle when desired, as the shuttle will simply slide upward in the notch relative to the interlock device.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A wire pulling system configured to pull and thread electrical wire over or through structural members of a building, comprising:
   a) an elongate shuttle, including a leading end and a trailing end;
   b) connecting means, associated with the shuttle, configured for connecting to the shuttle a wire to be pulled by the shuttle;
   c) an interlock device, separate from the shuttle and selectively and releasably engagable with the shuttle; and
   d) engaging means, associated with the shuttle and selectively and releasably engagable by the interlock device for transferring force from the interlock device to the shuttle to move the shuttle;
   e) wherein the engaging means includes at least one raised portion located on the shuttle, and the interlock device includes a notch, wherein the raised portion on the shuttle is configured to be selectively and releasably engaged by the notch in the interlock device; and
   f) wherein the at least one raised portion on the shuttle includes opposing engagement and tapered relief sections, the engagement section being substantially orthogonal to an elongate axis of the shuttle, and the tapered relief section extending taperedly toward the leading end of the shuttle.

2. A wire pulling system configured to pull and thread electrical wire over or through structural members of a building, comprising:
   a) an elongate shuttle, including a leading end and a trailing end;
   b) connecting means, associated with the shuttle, configured for connecting to the shuttle a wire to be pulled by the shuttle;
   c) an interlock device, separate from the shuttle and selectively and releasably engagable with the shuttle;
   d) engaging means, associated with the shuttle and selectively and releasably engagable by the interlock device for transferring force from the interlock device to the shuttle to move the shuttle;
   e) wherein the engaging means includes at least one raised portion located on the shuttle, and the interlock device includes a notch, wherein the raised portion on the shuttle is configured to be selectively and releasably engaged by the notch in the interlock device; and
   f) wherein the at least one raised portion extends circumferentially around the shuttle.

3. A wire pulling system configured to pull and thread electrical wire over or through structural members of a building, comprising:
   a) an elongate shuttle, including a leading end and a trailing end;
   b) connecting means, associated with the shuttle, configured for connecting to the shuttle a wire to be pulled by the shuttle;
   c) an interlock device, separate from the shuttle and selectively and releasably engagable with the shuttle; and
   d) engaging means, associated with the shuttle and selectively and releasably engagable by the interlock device for transferring force from the interlock device to the shuttle to move the shuttle;
   e) wherein the shuttle includes at least two portions removably coupled to each other.

4. A system in accordance with claim 1, wherein the leading end of the shuttle includes a substantially rounded frontal portion.

5. A system in accordance with claim 1, wherein the shuttle has a cross section that is substantially circular.

6. A wire pulling system configured to pull and thread electrical wire over or through structural members of a building, comprising:
   a) an elongate shuttle, configured to be connected to a wire;
   b) an interlock device, selectively and releasably engageable with the shuttle, the interlock device including a receiving notch and an engaging area adjacent the receiving notch;
   c) means for attaching an extension device to the interlock device to facilitate use of the wire pulling device in a location removed from a user; and
   d) a substantially high-fiction material coupled adjacent the engaging area to provide a substantially high-friction interface between the interlock device and the second section of the shuttle.

7. A system in accordance with claim 6, wherein the receiving notch is sized and shaped to receive a first portion of the shuttle while the engaging area contacts and transmits force to a second portion of the shuttle to enable transmission of force to the wire being pulled.

8. A system in accordance with claim 6, further comprising at least one hook coupled to the interlock device and being configured to engage an intermediate section of the wire to apply a slack-pulling force to the intermediate section of the wire.

9. A system in accordance with claim 6, wherein the means for attaching an extension device comprise a hollow section coupled to the interlock device to facilitate insertion of the extension device into the interlock device.

10. A system in accordance with claim 3, wherein the engaging means includes at least one raised portion located on the shuttle, and the interlock device includes a notch, wherein the raised portion on the shuttle is configured to be selectively and releasably engaged by the notch in the interlock device.

11. A system in accordance with claim 10, wherein the at least one raised portion on the shuttle includes opposing engagement and tapered relief sections, the engagement section being substantially orthogonal to an elongate axis of the shuttle, and the tapered relief section extending taperedly toward the leading end of the shuttle.

12. A system in accordance with claim 10, wherein the at least one raised portion extends circumferentially around the shuttle.

13. A system in accordance with claim 6, wherein the engaging means includes at least one raised portion located on the shuttle, and the interlock device includes a notch, wherein the raised portion on the shuttle is configured to be selectively and releasably engaged by the notch in the interlock device.

14. A system in accordance with claim 13, wherein the at least one raised portion on the shuttle includes opposing engagement and tapered relief sections, the engagement section being substantially orthogonal to an elongate axis of the shuttle, and the tapered relief section extending taperedly toward the leading end of the shuttle.

15. A system in accordance with claim 13, wherein the at least one raised portion extends circumferentially around the shuttle.

\* \* \* \* \*